May 9, 1933. J. FRITCSONS 1,907,534
ELECTROMAGNETIC DEVICE
Filed June 13, 1931
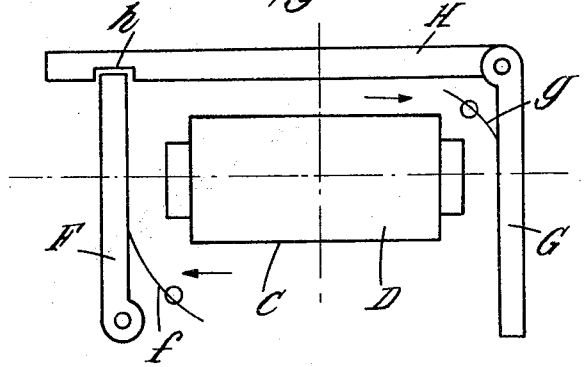
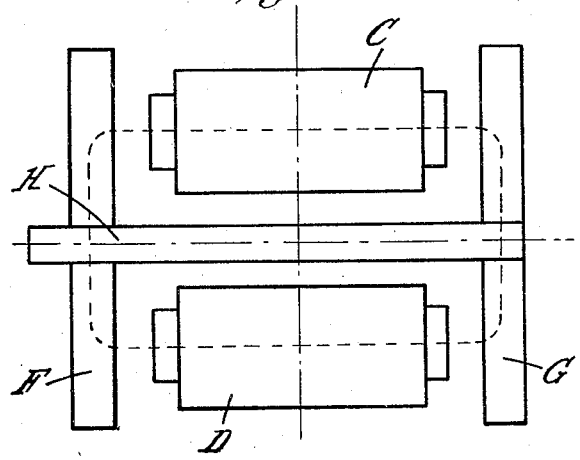

Patented May 9, 1933

1,907,534

UNITED STATES PATENT OFFICE

JURIS FRITCSONS, OF RIGA, LATVIA

ELECTROMAGNETIC DEVICE

Application filed June 13, 1931, Serial No. 544,254, and in Latvia July 11, 1930.

This invention relates to electro-magnetic devices of the kind in which the electromagnet operates two armatures one arranged adjacent to each pole.

According to the present invention the electro-magnetic device is so constructed and arranged that, when the energizing current is switched on, one of the armatures will move towards its pole before the other armature moves towards its pole. For this purpose one of the armatures may be arranged at a distance from its adjacent pole smaller than the distance of the other armature from its adjacent pole, the closer armature being the first to move towards the magnet when the energizing current is switched on and being the last to move away when the said current is switched off; or the armatures may be arranged at the same distances from their respective poles and may be controlled by springs or weights of different strengths in which case the armature with the weaker spring or weight is the first to move towards the magnet and is the last to move away. In either case the armature that is the first to move towards the magnet may serve as a mechanical lock for the other armature so as to normally prevent the latter from moving towards the magnet under the influence of shocks.

In order that the said invention may be clearly understood and readily carried into effect, the same will now be described more fully with reference to the accompanying drawing in which:—

Figures 1 and 2 are views at right angles to each other showing one form of device according to the present invention.

In Figures 1 and 2 there are two electromagnets C, D (although one only may be used), with two pivoted armatures F and G arranged at opposite ends of the pole pieces. These armatures are controlled by springs $f$ and $g$ of which the spring $g$ is weaker than the spring $f$ so that the armature G is the first one to move towards the magnet when the energizing current is switched on. A similar result can be obtained by suitably weighting the armatures or by arranging the armature G closer to the magnet than the armature F. There is an air space in the path of the lines of force of the electromagnet when the energizing current is switched on and in consequence the attraction of the magnet is comparatively weak but is sufficient to attract the armature G. The movement of this armature towards the magnet causes a decrease in the air space and a consequent increase in the attraction sufficient to cause the armature F to then move towards the magnet. When the energizing current is switched off, the armature F is the first to move away from the magnet and this causes an increase in the air space and a reduction in the strength of the attraction of the magnet due to residual magnetism, thereby permitting the armature G to be moved away from the magnet.

Figures 1 and 2 show a feature according to the present invention, viz. the means whereby the armature G normally locks the armature F so as to prevent the latter from moving towards the magnet under the influence of shocks. As will be seen the armatures are pivoted at opposite ends and the armature G has a transverse arm H formed with a notch $h$ to receive the free end of the armature F. Thus the latter armature is prevented from moving until the arm H has been moved by the armature G (which as aforesaid is the first to move towards the magnet when the energizing current is switched on) to bring the notch $h$ clear of the armature F. Conversely, when the energizing current is switched off, the armature F first returns to the position shown in Figure 1 ready for the notch $h$ to engage with it on the subsequent return of the armature G to the position shown.

What I claim and desire to secure by Letters Patent of the United States is:—

1. In an electro-magnetic device, the combination with the electro-magnet, of an armature arranged adjacent to one pole, an armature arranged adjacent to the other pole, means whereby one armature moves towards its pole before the other when the energizing current is switched on, thereby decreasing the air gap and increasing the magnetic attraction on the other armature which then moves towards its pole, and means whereby the armature that is the first to move towards its pole serves to normally prevent the other armature from moving towards its pole under the influence of shocks.

2. In an electro-magnetic device, the combination with two electro-magnets the energizing coils of which are arranged in the same energizing circuit, of two armatures arranged at opposite ends of the magnets, means whereby one armature moves towards the magnets before the other when the energizing current is switched on, thereby decreasing the air gap and increasing the magnetic attraction on the other armature which then moves towards the magnets, and means whereby the armature that is the first to move serves to normally prevent the other armature from moving under the influence of shocks.

3. In an electro-magnetic device, the combination with the electro-magnet, of an armature arranged adjacent to one pole, another armature arranged adjacent to the other pole but at a distance therefrom smaller than the distance of the former armature from its pole, and means whereby the armature that is first to move towards its pole serves to normally prevent the other armature from moving towards its pole under the influence of shocks.

4. In an electro-magnetic device, the combination with the electro-magnet, of two armatures, one arranged adjacent to each pole, springs of different strengths acting to keep the armatures away from the poles, the armature with the weaker spring being adapted to move towards its pole before the armature with the stronger spring, and means whereby the armature that is the first to move towards its pole serves to normally prevent the other armature from moving towards its pole under the influence of shocks.

JURIS FRITCSONS.